United States Patent
Naitou (10) Patent No.: US 9,590,466 B2
(45) Date of Patent: Mar. 7, 2017

(54) ROTOR AND ROTATING ELECTRIC MACHINE HAVING THE SAME

(71) Applicant: DENSO CORPORATION, Kariya, Aichi-pref. (JP)

(72) Inventor: Akihito Naitou, Nagoya (JP)

(73) Assignee: DENSO CORPORATION, Kariya (JP)

( * ) Notice: Subject to any disclaimer, the term of this patent is extended or adjusted under 35 U.S.C. 154(b) by 505 days.

(21) Appl. No.: 14/066,930

(22) Filed: Oct. 30, 2013

(65) Prior Publication Data
US 2014/0117792 A1     May 1, 2014

(30) Foreign Application Priority Data
Oct. 30, 2012    (JP) ................................ 2012-239149

(51) Int. Cl.
| H02K 1/27 | (2006.01) |
|---|---|
| H02K 1/28 | (2006.01) |
| H02K 7/04 | (2006.01) |
| H02K 21/14 | (2006.01) |

(52) U.S. Cl.
CPC ............. H02K 7/04 (2013.01); H02K 1/2746 (2013.01); H02K 1/28 (2013.01); H02K 21/14 (2013.01); H02K 2213/03 (2013.01)

(58) Field of Classification Search
CPC .......... H02K 1/27; H02K 29/08; H02K 1/278; H02K 1/2746; H02K 7/04; H02K 21/14; H02K 2213/03
USPC .... 310/152, 156.01, 156.51, 156.53, 156.56, 310/156.08, 156.38, 156.39, 156.41, 310/156.42, 156.43, 156.44, 156.45, 310/156.46, 156.54, 156.57, 216.097
See application file for complete search history.

(56) References Cited

U.S. PATENT DOCUMENTS

| 5,811,904 A | 9/1998 | Tajima et al. |
| 7,923,881 B2 * | 4/2011 | Ionel ...................... H02K 21/46 310/156.53 |

(Continued)

FOREIGN PATENT DOCUMENTS

| JP | 2012-5253 | 1/2012 |
| JP | 2012005253 A * | 1/2012 |

OTHER PUBLICATIONS

Machine translation of JP 2012-005253 A.*

(Continued)

Primary Examiner — Quyen Leung
Assistant Examiner — Minki Chang
(74) Attorney, Agent, or Firm — Nixon & Vanderhye P.C.

(57) ABSTRACT

A rotor for a rotating electric machine has a core body and a magnet. The core body has a through-hole, a first polar portion, and a second polar portion. The first polar portion and the second polar portion are alternately arranged in the circumference direction. The magnet is disposed on the core body at a position corresponding to the first polar portion or the second polar portion. The through-hole has an arc-shaped surface having a first curvature radius. The first polar portion has an arc-shaped surface having a second curvature radius. The second polar portion has an arc-shaped surface having a third curvature radius. The first curvature radius is larger than or equal to the second curvature radius. The first curvature radius is larger than or equal to the third curvature radius.

12 Claims, 5 Drawing Sheets

(56) References Cited

U.S. PATENT DOCUMENTS

| | | | |
|---|---|---|---|
| 2010/0244605 A1* | 9/2010 | Nakano | B62D 5/0403 310/156.01 |
| 2010/0289370 A1* | 11/2010 | Roth | H02K 1/2746 310/156.53 |
| 2010/0301695 A1* | 12/2010 | Yamada | H02K 1/2746 310/156.01 |
| 2012/0169163 A1* | 7/2012 | Imai | H02K 1/2746 310/71 |
| 2012/0187696 A1* | 7/2012 | Miyamoto | H02K 1/2746 290/55 |
| 2012/0194024 A1* | 8/2012 | Okada | H02K 1/278 310/156.01 |
| 2012/0326547 A1* | 12/2012 | Suzuki | H02K 1/2746 310/156.15 |

OTHER PUBLICATIONS

Office Action (3 pages) dated Aug. 15, 2014, issued in corresponding Japanese Application No. 2012-239149 and English translation (3 pages).

* cited by examiner

ROTOR AND ROTATING ELECTRIC MACHINE HAVING THE SAME

CROSS REFERENCE TO RELATED APPLICATION

This application is based on Japanese Patent Application No. 2012-239149 filed on Oct. 30, 2012, the disclosure of which is incorporated herein by reference in its entirety.

TECHNICAL FIELD

The present disclosure relates to a rotor and a rotating electric machine having the same.

BACKGROUND

Conventionally, a rotor is known to have a core body including a through-hole. For example, JP-2012-143090A (corresponding to US 2012/0169163A1) discloses a rotor having a core body which includes five through-holes arranged in a circumference direction of the core body at a regular interval. By having the five through-holes, the rotor may be lighter in weight and may have less inertia.

Generally, when a core body has a through-hole, a rotor may have reduction in rotation balance, magnetic balance, and strength. According to the rotor disclosed in JP-2012-143090A, the core body has a spoke portion. The spoke portion and the through-hole are alternately arranged in the circumference direction. By having the spoke portion, the strength of the core body may be restricted from decreasing. Further, by contriving shapes of the through-hole, the magnetic balance may be restricted from reducing. For example, the through-hole has a trapezoid shape in cross-section, in other words, an outer wall surface of the through-hole in a radial direction of the core body has a flat plane shape (see FIGS. 19-23 in JP-2012-143090A). However, the rotation balance may not be improved while the magnetic balance is improved.

JP-2012-143090A also discloses a rotor having a sector-shaped through-hole, in other words, an outer wall surface of the through-hole in the radial direction has a curved shape (see FIG. 18 in JP-2012-143090A). However, a specific shape such as curvature radius is not described as to the outer wall surface of the through-hole and a polar portion of the core body.

SUMMARY

The present disclosure addresses at least one of the above issues. Thus, it is an objective of the present disclosure to provide a rotor of which magnetic balance and strength is not decreased, and of which rotation balance is improved.

To achieve the objective of the present disclosure, there is provided a rotor for a rotating electric machine and the rotor has a core body and a magnet. The core body has a through-hole, a first polar portion, and a second polar portion. The through-hole has a sector shape in cross-section and passes through the core body in a thickness direction. The through-hole is one of a plurality of through-holes arranged in a circumference direction at a regular interval. The first polar portion and the second polar portion are alternately arranged in the circumference direction to define an outer wall of the core body in the radial direction. The magnet is disposed on the core body at a position corresponding to the first polar portion or the second polar portion.

The through-hole has an arc-shaped surface on an outer side in the radial direction, and the arc-shaped surface of the through-hole has a first curvature radius. The first polar portion has an arc-shaped surface on an outer side in the radial direction, and the arc-shaped surface of the first polar portion has a second curvature radius. The second polar portion has an arc-shaped surface on an outer side in the radial direction, and the arc-shaped surface of the second polar portion has a third curvature radius. The first curvature radius of the arc-shaped surface of the through-hole is larger than or equal to the second curvature radius of the arc-shaped surface of the first polar portion. The first curvature radius of the arc-shaped surface of the through-hole is larger than or equal to the third curvature radius of the arc-shaped surface of the second polar portion.

Accordingly, the rotation balance can be improved while the magnetic characteristics is improved, such that the output of the rotating electric machine can be increased.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described hereafter referring to drawings. In the embodiments, a part that corresponds to a matter described in a preceding embodiment may be assigned with the same reference number, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1A:
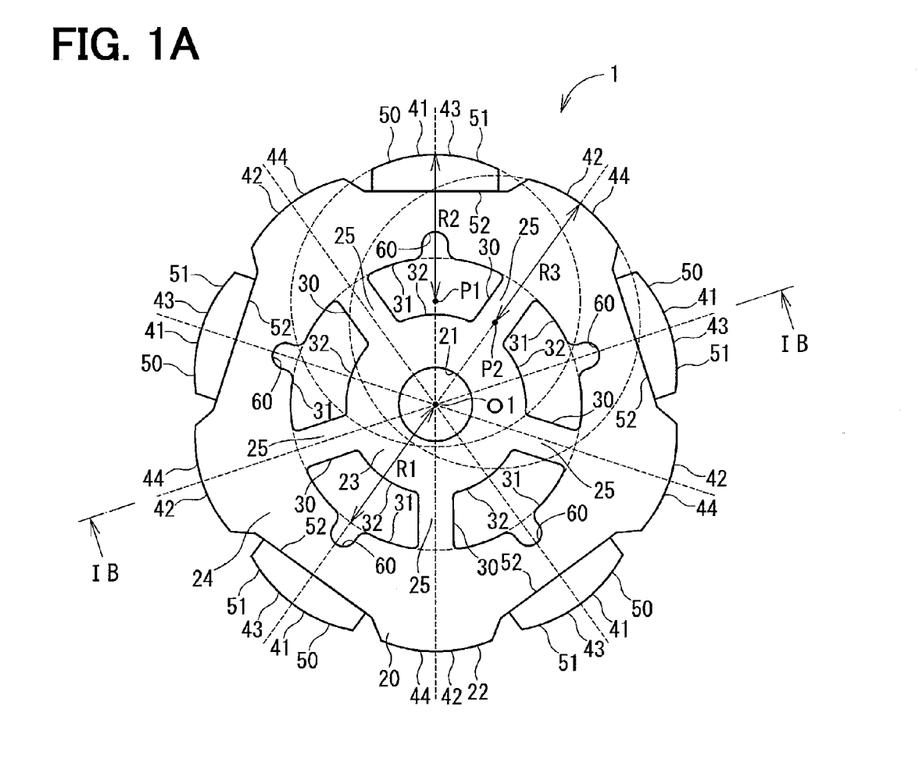
FIG. 1A is a view illustrating a rotor according to a first embodiment.
Figure 1B:
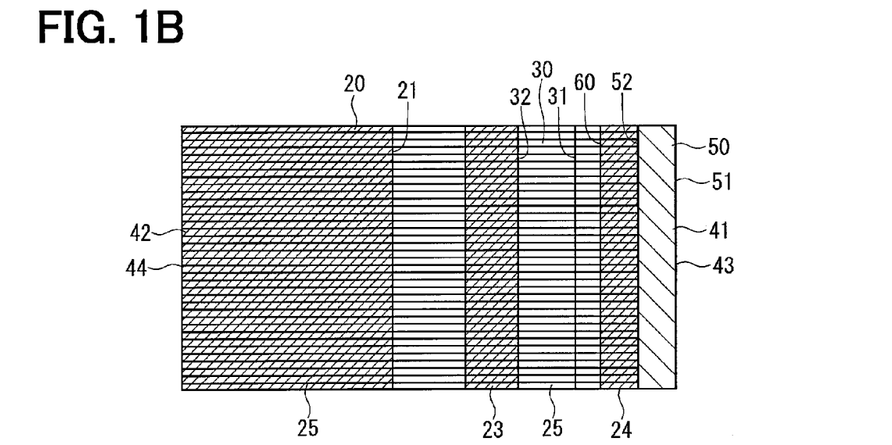
FIG. 1B is a cross-section view taken along a line IB-IB of FIG. 1A.
Figure 2:
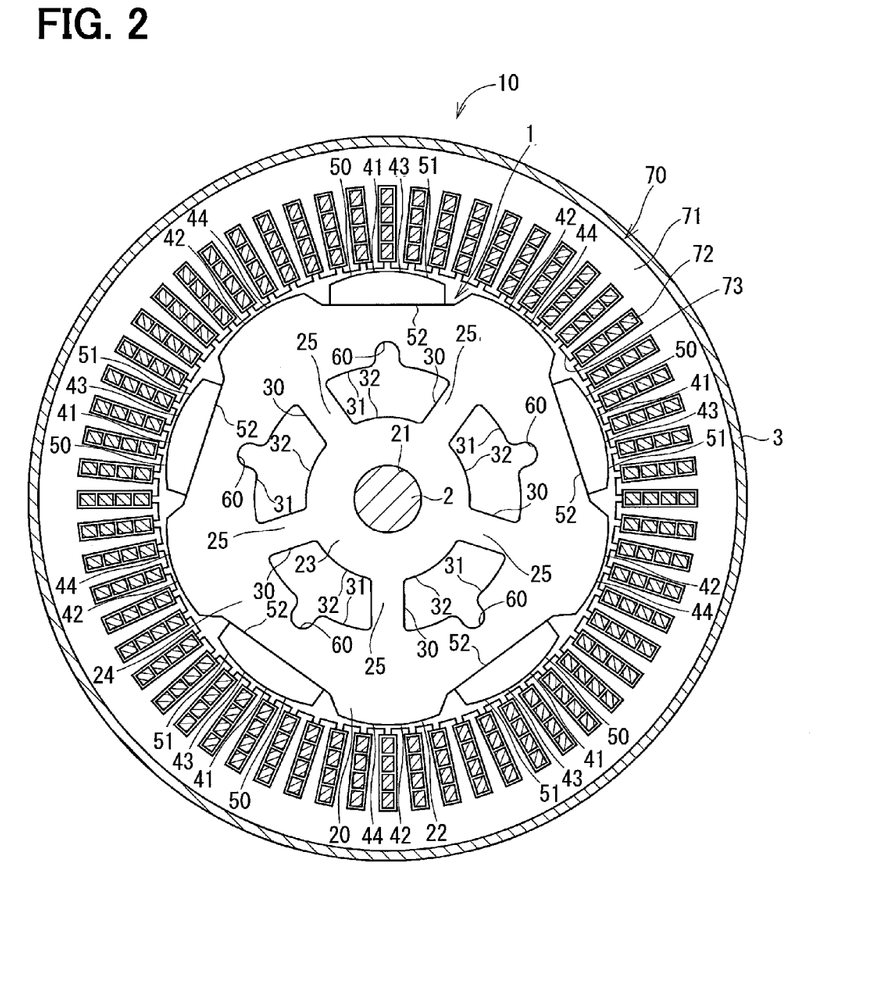
FIG. 2 is a cross-section view illustrating a rotating electric machine employing the rotor according to the first embodiment.

A rotor 1 according to a first embodiment is shown in FIGS. 1A and 1B, and a rotating electric machine 10 employing the rotor 1 is shown in FIG. 2.

The rotating electric machine 10 is used, for example, as a drive source (e.g., a motor) of an electric power steering device, which assists steering operation or the like in a vehicle. As shown in FIG. 2, the rotating electric machine 10 includes the rotor 1, a stator 70, a motor shaft 2, and a motor case 3.

As shown in FIGS. 1A and 1B, the rotor 1 includes a core body 20, a through-hole 30, a first polar portion 41, a second polar portion 42, and a magnet 50. The through-hole 30 may correspond to a first through-hole.

The core body 20 has a generally cylindrical shape in a manner that thin plates such as metal plates are laminated. The core body 20 has a shaft hole 21 defined around a shaft axis O1 to pass through the core body 20 in a thickness direction. The shaft axis O1 is a center axis of the core body 20.

The through-hole 30 has a generally sector shape in cross-section and penetrates the core body 20 in the thickness direction. According to the first embodiment, the core body 20 has five through-holes arranged in a circumference direction of the core body 20 at a regular interval. The through-hole 30 is one of the five through-holes. The through-hole 30 is located between the shaft axis O1 and an outer wall 22 of the core body 20 in a radial direction.

Moreover, the through-hole 30 has the generally sector shape in cross-section taken along a line which is perpendicular to the shaft axis O1. The through-hole 30 has an arc-shaped surface 31 and an arc-shaped surface 32. A distance from the shaft axis O1 to the arc-shaped surface 31 is larger than a distance from the shaft axis O1 to the arc-shaped surface 32. The arc-shaped surface 31 defines a curve-shaped wall such that a distance from the shaft axis O1 to a point of the curve-shaped wall of the arc-shaped surface 31 is fixed. The arc-shaped surface 32 defines a curve-shaped wall such that a distance from the shaft axis O1 to a point of the curve-shaped wall of the arc-shaped surface 32 is fixed. A flat-shaped wall portion is defined to extend from an end of the arc-shaped surface 31 to an end of the arc-shaped surface 32. The end of the arc-shaped surface 31 is located at a position corresponding to the end of the arc-shaped surface 32 in the radial direction.

By having the through-hole 30, an annular portion 23 is defined between the shaft hole 21 and the through-hole 30. The core body 20 has an annular portion 24 on an external side of the through-hole 30 in the radial direction. The core body 20 further has a spoke portion 25. The spoke portion 25 and the through-hole 30 are arranged alternately in the circumference direction. The spoke portion 25 extends from the annular portion 23 to the annular portion 24 in the radial direction. According to the first embodiment, the core body 20 has five spoke portions, and the spoke portion 25 is one of the five spoke portions.

The first polar portion 41 is located to define the outer wall 22 of the core body 20 in the radial direction. The first polar portion 41 and the second polar portion 42 are arranged alternately in the circumference direction. According to the first embodiment, the rotor 1 has five of the first polar portions 41 and five of the second polar portions 42. The first polar portions 41 are arranged in the circumference direction at a regular interval, and the second polar portions 42 are also arranged in the circumference direction at a regular interval. The first polar portion 41 and the second polar portion 42 are alternately arranged in the circumference direction at a regular interval.

According to the first embodiment, the first polar portion 41 is located on the external side of the core body 20 with respect to the through-hole 30 in the radial direction. The first polar portion 41 has an arc-shaped surface 43 defining an outer surface of the first polar portion 41 in the radial direction. The first polar portion 41 is disposed such that a center of the arc-shaped surface 43 of the first polar portion 41 in the circumference direction and a center of the arc-shaped surface 31 of the through-hole 30 in the circumference direction are positioned in a linear line extending from the shaft axis O1 in the radial direction. The center of the arc-shaped surface 43 is located on an external side of the center of the arc-shaped surface 31 in the radial direction. The arc-shaped surface 43 defines a curve-shaped wall surface such that a distance from a point P1 (center of curvature) to a point of the curve-shaped wall surface of the arc-shaped surface 43 is fixed. The point P1, the center of the arc-shaped surface 43 in the circumference direction, and the center of the arc-shaped surface 31 in the circumference direction are in a linear line extending from the shaft axis O1 in the radial direction.

The second polar portion 42 is located on the external side of the core body 20 with respect to the spoke portion 25 in the radial direction. The second polar portion 42 has an arc-shaped surface 44 defining an outer surface of the second polar portion 42 in the radial direction. The second polar portion 42 is disposed such that a center of the arc-shaped surface 44 of the second polar portion 42 in the circumference direction and a center of the spoke portion 25 in the circumference direction are in a linear line extending from the shaft axis O1 in the radial direction. The center of the arc-shaped surface 44 is located on an external side of the center of the spoke portion 25 in the radial direction. The arc-shaped surface 44 defines a curve-shaped wall surface such that a distance from a point P2 (center of curvature) to a point of the curve-shaped wall surface of the arc-shaped surface 44 is fixed. The point P2, the center of the arc-shaped surface 44 in the circumference direction, and the center of the spoke portion 25 in the circumference direction are in the linear line extending from the shaft axis O1 in the radial direction.

The arc-shaped surface 31 of the through-hole 30 has a first curvature radius R1 (i.e., a distance from the shaft axis O1 to the arc-shaped surface 31). The arc-shaped surface 43 of the first polar portion 41 has a second curvature radius R2 (i.e., a distance from the point P1 to the arc-shaped surface 43). The arc-shaped surface 44 of the second polar portion 42 has a third curvature radius R3 (i.e., a distance from the point P2 to the arc-shaped surface 44). The through-hole 30, the first polar portion 41, and the second polar portion 42 are disposed so that the first curvature radius R1 is equal to the second curvature radius R2, and that the second curvature radius R2 is equal to the third curvature radius R3 (R1=R2=R3).

The magnet 50 is made of a permanent magnet such as neodymium magnet and has a rectangular-plate shape. A length of the magnet 50 in a longitudinal direction is generally the same as long as a length of the core body 20 in an axial direction of the core body 20. The magnet 50 includes a curved surface 51 having a curved shape and a flat surface 52 having a flat shape. The magnet 50 is disposed at a position corresponding to the first polar portion 41 such that the length of the magnet 50 in the longitudinal direction is parallel to the shaft axis O1. That is, according to the first embodiment, the rotor 1 has five magnets arranged in the circumference direction at a regular interval, and the magnet 50 is one of the five magnets.

The magnet 50 is disposed such that the curved surface 51, which is a part of an outer wall of the magnet 50 in the radial direction, coincides with the arc-shaped surface 43. That is, the curved surface 51 is exposed on an outside of an outer wall of the core body 20 in the radial direction. The magnet 50 is attached to the core body 20 by adhesive or the like. As discussed above, the rotor 1 according to the first embodiment is employed to the rotating electric machine 10, which is a surface-permanent-magnet-type (SPM-type) rotating electric machine.

The magnet 50 is disposed so that the center of the arc-shaped surface 31 in the circumference direction is located in a linear line extending in the radial direction from the shaft axis O1 to a center of the magnet 50 in the circumference direction. The core body 20 has the five magnets and the five through-holes, in other words, the number of magnets is the same as many as the number of through-holes.

Moreover, the magnet 50 is disposed so that the curved surface 51 is magnetized as north pole and that the flat surface 52 is magnetized as south pole.

The magnet 50 produces a magnetic flux. Therefore, the first polar portion 41 has a magnetic pole, and the second polar portion 42 has a pseudo-magnetic-pole produced by the magnetic flux passing through the second polar portion 42.

According to the first embodiment, the rotor 1 has the five magnets, the five of the first polar portion, and the five of the second polar portions. In other words, the number of magnets is half of the total number of the first polar portions and the second polar portions. That is, the rotor 1 is employed to the rotating electric machine 10, which is a half-magnet-type rotating electric machine.

Further, according to the first embodiment, the core body 20 has a through-hole 60, and the through-hole 60 may correspond to a second through-hole. The through-hole 60 extends outwardly from the arc-shaped surface 31 of the first through-hole 30 in the radial direction. A center of the through-hole 60 in the circumference direction and the center of the arc-shaped surface 31 in the circumference direction are in a linear line extending from the shaft axis O1 in the radial direction. The through-hole 60 penetrates the core body 20 in the thickness direction of the core body 20.

As shown in FIG. 2, the stator 70 has a core body 71 and a winding wire 72.

The core body 71 is made of laminated thin plates such as iron plates and has a generally annular shape. The core body 71 includes a teeth portion 73 extending inwardly in the radial direction. According to the first embodiment, the core body 71 has sixty teeth portions arranged in a circumference direction of the core body 71 at a regular interval. The teeth portion 73 is one of the sixty teeth portions.

The winding wire 72 is made of metal such as copper and disposed to the core body 71 such that the winding wire 72 is wound to occupy spaces defined between the teeth portions 73 adjacent with each other in the circumference direction. The winding wire 72 is wound to define multiple phases in the rotating electric machine 10.

The motor shaft 2 is made of a material such as metal and has a stick shape. The motor shaft 2 is inserted and fixed in the shaft hole 21 of the core body 20 of the rotor 1. The motor case 3 is made of a material such as metal and has a generally cylindrical shape. An opening at an end of the motor case 3 in the axial direction is sealed by an end frame (not shown), and the other axial open end of the motor case 3 may also sealed by the end frame. The motor case 3 has the rotor 1 and the stator 70 inside. The stator 70 is fixed in the motor case 3 so that an outer wall of the core body 71 in the radial direction fits to an inner wall of the motor case 3.

The end frame sealing the both ends of the motor case 3 works as a bearing and holds each end of the motor shaft 2. Therefore, the rotor 1 rotates in the motor case 3, specifically, inside the stator 70.

When electricity is supplied to the winding wire 72 of the stator 70, a rotating magnetic field is produced by the stator 70. Based on the rotating magnetic field, the rotor 1 and the motor shaft 2 rotate integrally. The motor shaft 2 outputs the rotation of the rotor 1 of the rotating electric machine 10.

As discussed above, the through-hole 30 has the generally sector shape in cross-section and penetrates the core body 20 in the thickness direction. According to the first embodiment, the core body 20 has the five through-holes arranged in the circumference direction of the core body 20 at the regular interval. Therefore, the rotor 1 can be lighter in weight and may have less inertia. Further, by defining the through-hole 30 to have the generally sector shape in cross-section, magnetic balance can be restricted from decreasing. Moreover, by arranging the five through-holes in the circumference direction at the regular interval, the spoke portion 25 is defined so that the through-hole 30 and the spoke portion 25 are alternately arranged in the circumference direction. Therefore, strength can be restricted from decreasing.

The first polar portion 41 and the second polar portion 42 are arranged alternately in the circumference direction of the core body 20 at the regular interval to define the outer wall 22 of the core body 20 in the radial direction. The magnet 50 is disposed on the core body 20 at the position corresponding to the first polar portion 41.

The through-hole 30 has the arc-shaped surface 31 on the outer side of the core body 20 in the radial direction. The first polar portion 41 has the arc-shaped surface 43 on the outer side of the core body 20 in the radial direction. The second polar portion 42 has the arc-shaped surface 44 on the outer side of the core body 20 in the radial direction. The arc-shaped surface 31 of the through-hole 30 has the first curvature radius R1. The arc-shaped surface 43 of the first polar portion 41 has the second curvature radius R2. The arc-shaped surface 44 of the second polar portion 42 has the third curvature radius R3. The through-hole 30, the first polar portion 41, and the second polar portion 42 are arranged so that the first curvature radius R1 is equal to the second curvature radius R2 and that the second curvature radius R2 is equal to the third curvature radius R3 (R1=R2=R3). Therefore, by employing the rotor 1 to the rotating electric machine 10, a rotating balance of the rotor 1 can be improved. Moreover, a magnetic property of the rotor 1 can be improved. Accordingly, power generating ability of the rotating electric machine 10 is improved.

The core body 20 has the through-hole 30 and the through-hole 60. The through-hole 60 is defined to extend outwardly from the arc-shaped surface 31 in the radial direction so as to be integrated with the through-hole 30. The center of the through-hole 60 in the circumference direction, the center of the arc-shaped surface 31 in the circumference direction, and the shaft axis O1 are arranged in the same linear line extending in the radial direction. Accordingly, rotating balance of the rotor 1 can be restricted from decreasing, and the rotor 1 can be more lighter in weight.

The center of the magnet 50 in the circumference direction, the center of the arc-shaped surface 31 in the circumference direction, and a center of the rotor core 20 (i.e., the shaft axis O1) are arranged in the linear line extending in the radial direction. Therefore, the magnetic flux produced by the magnet 50 (i.e., the first polar portion 41) is mandatorily guided toward the pseudo-magnetic-pole (i.e., the second polar portion 42) due to the through-hole 60. Accordingly, magnetic balance can be improved.

The rotor 1 has the five magnets, the five of the first polar portions, and the five of the second polar portions. In other words, the number of the magnets 50 is half of the total number of the first polar portions 41 and the second polar portions 42. That is, the rotor 1 is employed to the rotating electric machine 10, which is a half-magnet-type rotating electric machine. Therefore, the pseudo-magnetic-pole is defined at the second polar portion 42 to which the magnet 50 is not disposed.

The core body 20 is made of laminated thin plates. Therefore, eddy current produced in the core body 20 in the axial direction can be reduced. Accordingly, a motor efficiency of the rotating electric machine 10 can be increased.

According to the first embodiment, the rotor 1 has the five through-holes, the five of the first polar portions, and the five of the second polar portions. In other words, the number of the through-holes 30 is half of the total number of the first polar portions 41 and the second polar portions 42. That is, the number of the through-holes 30 is the same as the number of pairs of the first polar portion 41 and the second polar portion 42. Therefore, the rotating balance of the rotor 1 can be much improved.

The magnet 50 is disposed such that the curved surface 51, which is a part of the outer wall in the radial direction, is located at the same position as the arc-shaped surface 43. That is, the rotating electric machine 10 is the SPM-type rotating electric machine.

Second Embodiment

Figure 3:
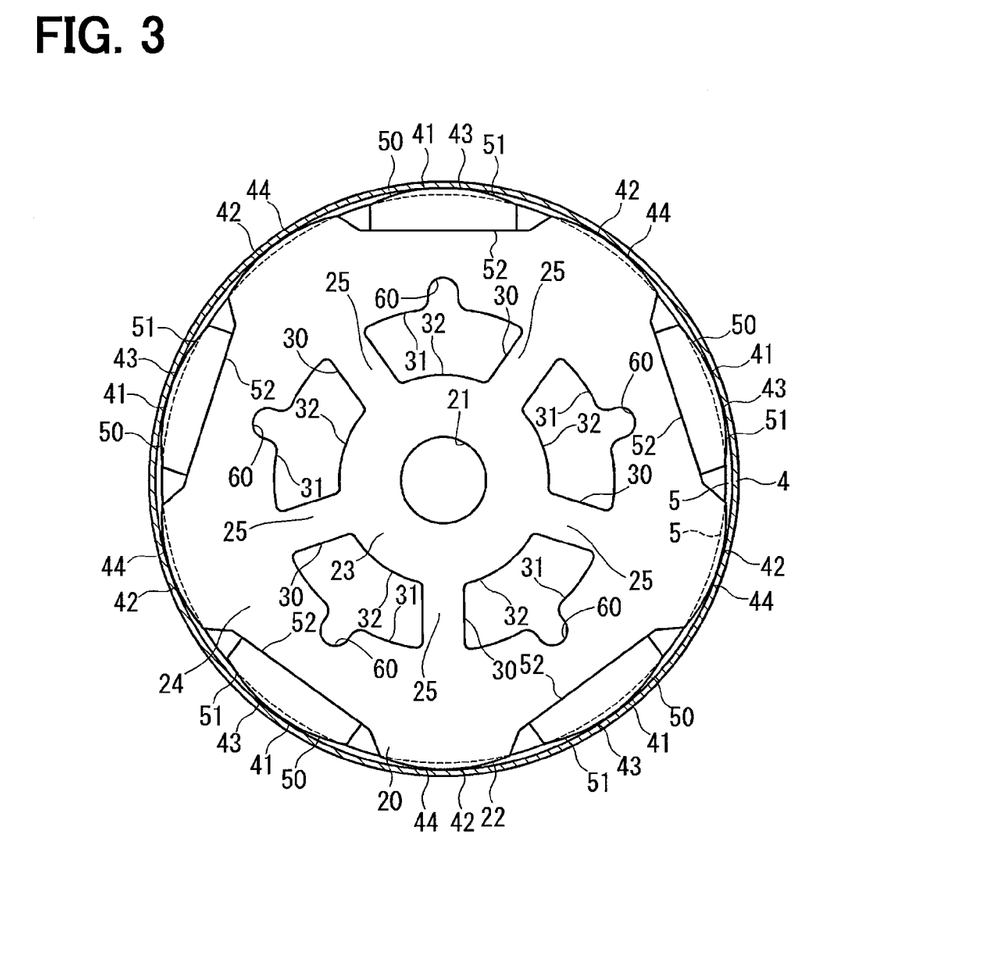
FIG. 3 is a view illustrating a rotor according to a second embodiment.

A rotor according to a second embodiment will be described with reference to FIG. 3. According to the second embodiment, the core body 20 holds the magnet 50 differently from the first embodiment.

According to the second embodiment, the rotor further has a tubular portion 4. The tubular portion 4 is made of a material such as metal, and has a generally cylindrical shape. The tubular portion 4 is disposed on the external side of the core body 20 in the radial direction so that an inner wall of the tubular portion 4 fits to the outer wall (i.e., the curved surface 51) of the magnet 50. Accordingly, the magnet 50 is supported on an outer surface of the core body 20 in the radial direction. Therefore, the magnet 50 can be fixed to the core body 20 without using an adhesive material.

Further, the tubular portion 4 has an annular recess 5 which is formed by plastically deforming axial ends of the tubular portion 4 inward in the radial direction. The annular recess 5 is located on an inner side of the tubular portion 4 in the radial direction. The annular recess 5 restricts the magnet 50 from slipping out in the axial direction, and restricts the tubular portion 4 from moving in the axial direction.

As discussed above, according to the second embodiment, the rotor has the tubular portion 4 disposed on the external side of the core body 20 in the radial direction so that the inner wall of the tubular portion 4 is in indirect or direct contact with the outer wall (i.e., the curved surface 51) of the magnet 50. Accordingly, the magnet 50 can be fixed to the core body 20 without using an adhesive material. Therefore, cost for producing the rotor is reduced.

Moreover, by locating the second polar portion 42 (i.e., the pseudo-magnetic-pole) on an external side of the spoke portion 25 in the radial direction, strength of the rotor is improved.

Third Embodiment

Figure 4:
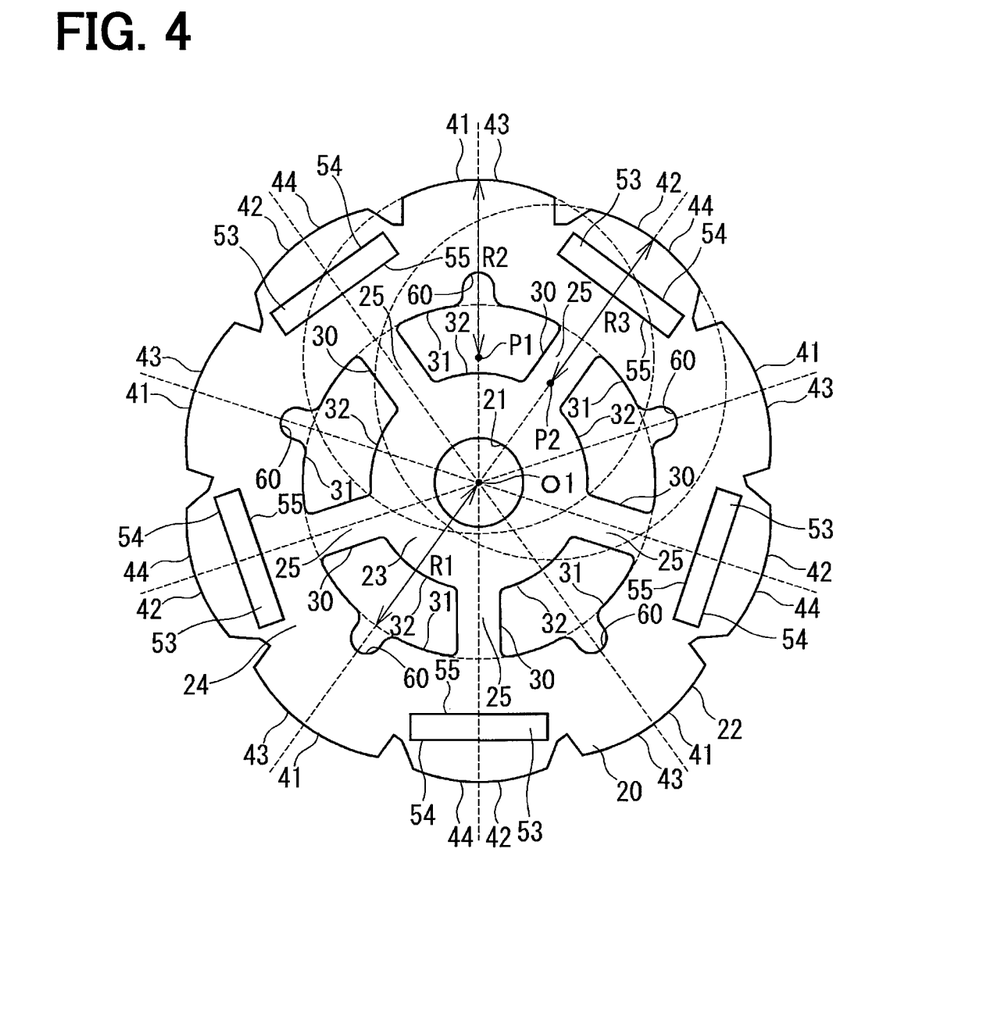
FIG. 4 is a view illustrating a rotor according to a third embodiment.

A rotor according to a third embodiment will be described with reference to FIG. 4. A location of a magnet is different from the first embodiment.

According to the third embodiment, a magnet 53 having a flat-plate shape is employed. A length of the magnet 53 in a longitudinal direction is generally the same as a length of the core body 20 in the axial direction. The magnet 53 has a flat surface 54 and a flat surface 55, and the flat surface 54 is parallel to the flat surface 55. The magnet 53 is disposed to a position corresponding to the second polar portion 42 such that the longitudinal direction of the magnet 53 is parallel to the shaft axis O1. That is, according to the third embodiment, the core body 20 has five magnets arranged in the circumference direction of the core body 20 at the regular interval, and the magnet 53 is one of the five magnets.

The magnet 53 is disposed on the inner side of the outer wall 22 of the core body 20 in the radial direction. That is, the magnet 53 is disposed inside the core body 20, for example, the magnet 53 is inserted into the core body 20. Accordingly, the rotor according to the third embodiment is used for an interior-permanent-magnet-type (IPM-type) rotating electric machine.

The magnet 53 is disposed so that a center of the magnet 53 in the circumference direction and the center of the arc-shaped surface 31 in the circumference direction are in a linear line extending from the shaft axis O1 in the radial direction. The core body 20 has the five magnets and the five through-holes, in other words, the number of the magnets 53 is the same as many as the number of the through-holes 30. The magnet 53 is located on an external side of the spoke portion 25 in an extending direction of the spoke portion 25, in other words, in the radial direction.

The magnet 53 is disposed so that the flat surface 54 is magnetized as north pole and that the flat surface 55 is magnetized as south pole. The magnet 53 produces a magnetic flux. Therefore, the second polar portion 42 has a magnetic pole, and the first polar portion 41 has a pseudo-magnetic-pole produced by the magnetic flux passing through the first polar portion 41.

According to the third embodiment, the rotor has the five magnets, the five of the first polar portions, and the five of the second polar portions. In other words, the number of the magnets 53 is half of the total number of the first polar portions 41 and the second polar portions 42. That is, the rotor is employed to the rotating electric machine 10, which is a half-magnet-type rotating electric machine.

Aspects except for structures discussed above according to the third embodiment are the same as aspects according to the first embodiment.

As discussed above, the magnet 53 is located to the position corresponding to the second polar portion 42.

As is the case with the first embodiment, the rotor according to the third embodiment has the core body 20 including the through-hole 60. The through-hole 60 is defined to extend outwardly from the arc-shaped surface 31 in the radial direction.

The center of the magnet 53 in the circumference direction and the center of the spoke portion 25 in the circumference direction are in a linear line extending from the shaft axis O1 in the radial direction. The center of the spoke portion 25 in the circumference direction corresponds to a middle position between the through-holes 30 adjacent with each other in the circumference direction. Therefore, the magnetic flux produced by the magnet 53 (i.e., the second polar portion 42) is mandatorily guided toward the pseudo-magnetic-pole (i.e., the first polar portion 41) by the through-hole 60. Accordingly, magnetic balance can be improved.

Further, the number of the magnets 53 is the same as many as the number of the through-holes 30. Therefore, rotating balance is improved.

The rotor has the five magnets, the five of the first polar portions, and the five of the second polar portions. In other words, the number of the magnets 53 is half of the total number of the first polar portions 41 and the second polar portions 42. That is, the rotor is employed to the rotating electric machine 10, which is a half-magnet-type rotating electric machine. The pseudo-magnetic-pole is defined at the first polar portion 41 to which the magnet 53 is not disposed.

Other Embodiment

According to the above embodiments, the through-hole 30, the first polar portion 41, and the second polar portion 42 are disposed so that the first curvature radius R1 is equal to the second curvature radius R2, and the second curvature radius R2 is equal to the third curvature radius R3 (R1=R2=R3). However, the first curvature radius R1 may be bigger than the second curvature radius R2, and the first curvature radius R1 may also be bigger than the third curvature radius R3 (R1>R2, R1>R3). That is, according to the present disclosure, the through-hole 30, the first polar portion 41, and the second polar portion 42 are arranged so that the first curvature radius R1 may be bigger than or equal to the second curvature radius R2, and that the first curvature radius R1 may also be bigger than or equal to the third curvature radius R3 (R1≥R2, R1≥R3). By employing such a structure, rotating balance of the rotor 1 may be improved.

Although the core body 20 has the through-hole 60 according to the above embodiments, the through-hole 60 may not be necessary.

The center of the magnet 50 in the circumference direction may not be located on the linear line extending in the radial direction from the shaft axis O1 to the center of the arc-shaped surface 31 in the circumference direction. The center of the magnet 53 in the circumference direction may not be located on the linear line extending in the radial direction from the shaft axis O1 to the center of the spoke portion 25 in the circumference direction.

Figure 5:
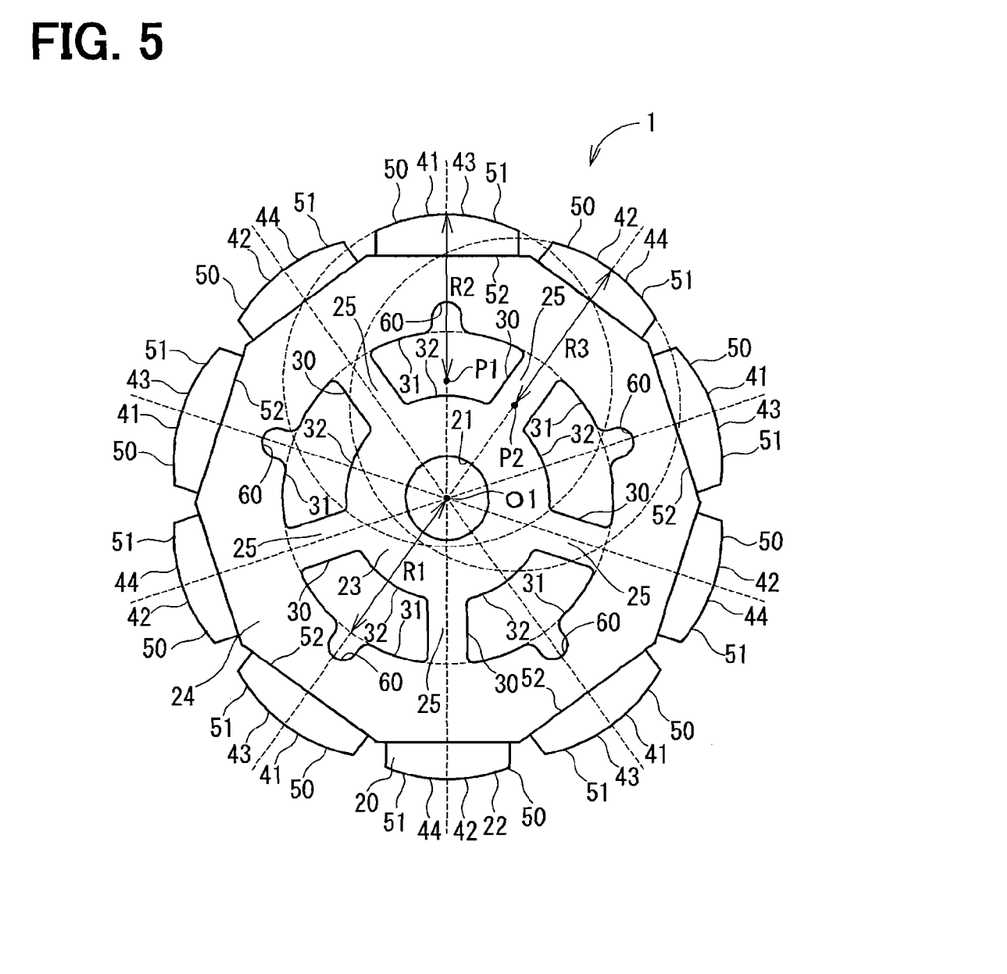
FIG. 5 is a view illustrating a rotor according to other embodiment.

The number of the magnets 50, 53 may be the same as many as the total number of the first polar portions 41 and the second polar portions 42. That is, the rotating electric machine 10 employing the rotor may be a full-magnet-type rotating electric machine, as shown in FIG. 5.

Although the core body 20 is made of laminated thin plates according to the above embodiments, it is not limited. The core body 20 may be made by a method such as molding and cutting work.

The number of through-holes is not limited to be half of the total number of the first polar portions 41 and the second polar portions 42. The total number of the first polar portions 41 and the second polar portions 42 is not limited to ten.

The rotating electric machine 10 employing the rotor is not limited to be used for the electric power steering device, and may be used as a drive source to drive other devices such as an electric device.

Such changes and modifications are to be understood as being within the scope of the present disclosure as defined by the appended claims.

What is claimed is:

1. A rotor for a rotating electric machine, the rotor comprising:
   a core body having
      a first through-hole having a sector shape in cross-section and passing through the core body in a thickness direction, the first through-hole being one of a plurality of first through-holes arranged in a circumference direction at a regular interval, and
      a first polar portion and a second polar portion alternately arranged in the circumference direction to define an outer wall of the core body in a radial direction; and
   a magnet disposed on the core body at a position corresponding to the first polar portion or the second polar portion, wherein
   the first through-hole has a first arc-shaped surface on an outer side in the radial direction, and the first arc-shaped surface of the first through-hole has a first curvature radius being centered at a center axis of the core body coincident with a shaft axis,
   the first polar portion has a second arc-shaped surface on an outer side in the radial direction, and the second arc-shaped surface of the first polar portion has a second curvature radius being centered at a first point,
   the second polar portion has a third arc-shaped surface on an outer side in the radial direction, and the third arc-shaped surface of the second polar portion has a third curvature radius being centered at a second point,
   the first curvature radius of the arc-shaped surface of the first through-hole is larger than or equal to the second curvature radius of the arc-shaped surface of the first polar portion,
   the first curvature radius of the arc-shaped surface of the first through-hole is larger than or equal to the third curvature radius of the arc-shaped surface of the second polar portion,
   the first point is located between the center axis and the second arc-shaped surface of the first polar portion in the radial direction, such that the first point and the center axis are not coincident, and
   the second point is located between the center axis and the third arc-shaped surface of the second polar portion in the radial direction, such that the second point and the center axis are not coincident.

2. The rotor for the rotating electric machine according to claim 1, wherein
   the core body has a second through-hole defined to extend outwardly in the radial direction from a center part of the arc-shaped surface of the first through-hole in the circumference direction.

3. The rotor for the rotating electric machine according to claim 1, wherein
   the magnet is arranged in a manner that a center of the arc-shaped surface of the first through-hole in the circumference direction is located on a linear line between a center of the magnet in the circumference direction and a center of the core body.

4. The rotor for the rotating electric machine according to claim 1, wherein
   the magnet is arranged in a manner that a middle position between the first through-holes adjacent with each other in the circumference direction is located on a linear line between a center of the magnet in the circumference direction and a center of the core body.

5. The rotor for the rotating electric machine according to claim 1, wherein
   the magnet is one of a plurality of magnets, and a number of the plurality of magnets is half of a total number of the first polar portion and the second polar portion alternately arranged in the circumference direction.

6. The rotor for the rotating electric machine according to claim 1, wherein the magnet is one of a plurality of magnets, and a number of the plurality of magnets is the same as a total number of the first polar portion and the second polar portion alternately arranged in the circumference direction.

7. The rotor for the rotating electric machine according to claim 1, wherein
the core body is made of laminated thin plates.

8. The rotor for the rotating electric machine according to claim 1, wherein
a number of the plurality of first through-holes is half of a total number of the first polar portion and the second polar portion alternately arranged in the circumference direction.

9. The rotor for the rotating electric machine according to claim 1, wherein
the magnet is disposed on an inner side of the outer wall of the core body in the radial direction.

10. The rotor for the rotating electric machine according to claim 1, wherein
the magnet is disposed such that an outer wall of the magnet coincides with the arc-shaped surface of the first polar portion.

11. A rotating electric machine comprising: the rotor according to claim 1; and a stator disposed on an outer side of the rotor in the radial direction such that a rotating magnetic field is produced by electric power applied to the stator.

12. The rotor for a rotating electric machine according to claim 1, wherein
the first polar portion protrudes outward from the core body in the radial direction, and
the second polar portion is provided by the magnet, and the second polar portion is exposed on an outer wall of the core body that excludes the first polar portion.

* * * * *